United States Patent Office 3,040,584
Patented June 26, 1962

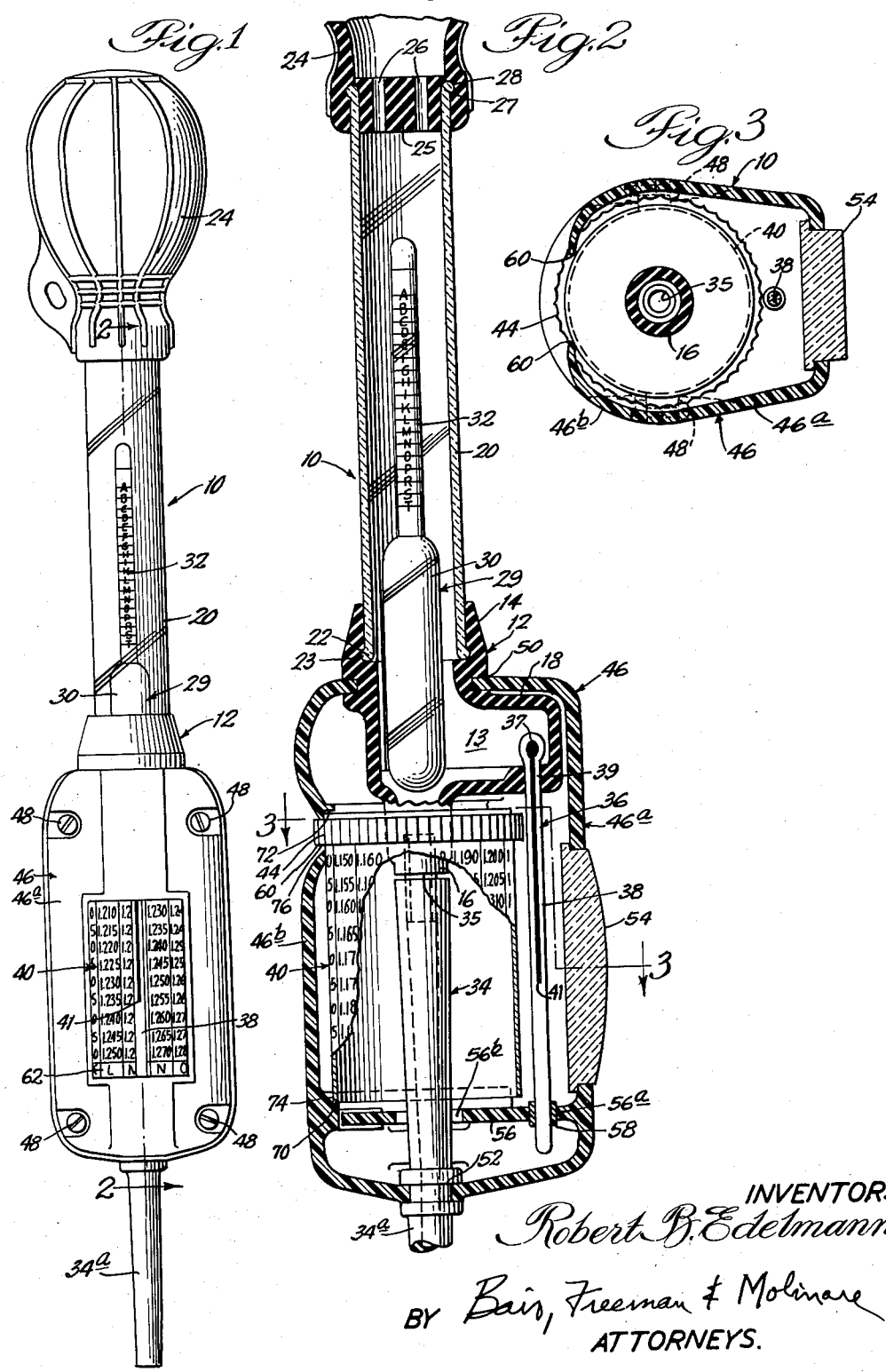

3,040,584
BATTERY HYDROMETER
Robert B. Edelmann, Chicago, Ill., assignor to E. Edelmann & Co., Chicago, Ill., a corporation of Illinois
Filed Apr. 18, 1960, Ser. No. 23,093
6 Claims. (Cl. 73—443)

This invention relates to a battery hydrometer and more particularly to an improved, temperature-compensating, battery hydrometer.

In the measurement of specific gravity of battery fluid it is well known that the temperature of the battery fluid affects the true specific gravity of the fluid and that, accordingly, the specific gravity measurement must be compensated for, depending upon the battery-fluid temperature. Heretofore, however, no efficient instrument has been provided which makes the testing of the specific gravity of battery fluid of utmost simplicity. The service station attendant has, heretofore, been required to make two readings, usually at two spaced regions, one of the readings being of specific gravity and the other reading of temperature. The attendant then is required to mentally compute the true specific gravity, all of which is an inconvenient and inefficient procedure.

Thus, one object of this invention is to provide an improved battery hydrometer wherein the specific gravity and temperature measurements may be more rapidly, conveniently, and quickly correlated with a chart carried by the hydrometer to give the true temperature-corrected value of specific gravity of the battery fluid being tested.

Another object of this invention is to provide a battery hydrometer wherein the elements for reading values of specific gravity and temperature are so aligned with each other in a vertical direction, and the temperature reading element is so aligned in a horizontal direction with the chart exhibiting values of temperature-compensated specific gravity, as to permit of most rapid and efficient determination of the true specific gravity of the battery fluid being tested.

A further object of this invention is to provide a battery hydrometer that is characterized by its efficiency of operation and convenience in rendering service.

It should further be observed that in a hydrometer there usually exits a temperature gradient throughout the sample of fluid being tested. For that reason it is desirable that the portion of the fluid sample whose temperature is being measured should be located as close as possible to the portion of the fluid whose specific gravity is being measured by the float, so as to avoid improper readings. Another desirable feature is to avoid dividing the sample of fluid into spaced portions, one of which may be measured for temperature and the other being measured for specific gravity.

Thus, still another object of this invention is to provide a battery hydrometer where the temperature and specific gravity measuring elements are located in close proximity to each other and each engages substantially the same portion of the sample of liquid being tested, so that a more precise temperature-compensated value of specific gravity may be determined, and wherein the said measuring elements are arranged to extend in opposite directions relative to each other from the single portion of liquid sample being tested, so that neither of said measuring elements interferes with the readability of the value being determined by the other measuring element.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a side elevation view of a temperature-compensating battery hydrometer which is constructed in accordance with this invention;

FIGURE 2 is an enlarged cross-section view taken substantially on line 2—2 of FIGURE 1; and FIGURE 3 is a cross-section view taken substantially on line 3—3 of FIGURE 2.

Referring now to the drawings, there is shown in FIGURE 1 a battery hydrometer, generally indicated by numeral 10, which embodies the invention disclosed herein. The details of construction of the interior of the hydrometer are best seen in the cross-section views of FIGURES 2 and 3. The hydrometer 10 includes a chamber-defining hollow body, generally indicated at 12, which substantially encloses an electrolyte-receiving chamber 13. The body 12 is shaped to define an upwardly extending sleeve part 14, a downwardly extending sleeve part 16, and a laterally enlarged portion 18. The hollow body 12 is preferably formed of rubber or other resilient, moldable, material which is non-reactive with battery electrolyte liquid that is to be received therein. The upwardly extending sleeve part 14 is resiliently distendable to receive thereinto the lower end of a float tube 20, which is preferably formed of glass or other transparent material. The lower edge of float tube 20 is provided with an enlarged bead 22 which cooperates with an annular recess 23 formed in body 12 to provide a secure connection between the body 12 and the float tube 20.

The upper end of the float tube 20 has suction means connected thereto in the form of a flexible rubber bulb 24. A plug 25 having a plurality of longitudinal air flow passageways 26 therethrough is press fit into the upper end of tube 20, and operates to prevent violent air movements in tube 20 when bulb 24 is squeezed. The upper end of tube 20 is provided with a bead 27 for gripping cooperation with an annular recess 28 defined in the inner wall of bulb 24.

Positioned within the electrolyte-receiving chamber 13 and extending upwardly into the float tube 20 is a hollow, weighted, glass float, generally indicated at 29, having a lower buoyant portion 30 and an upper, reduced indicating stem portion 32. The buoyant portion 30 is adapted to be engaged by electrolyte that is drawn into chamber 13 and tube 20. The reduced stem portion 32 has indicia either marked thereon, or contained therein and visible through the transparent walls of stem 32. The arrangement is such that when electrolyte fluid is properly drawn into the chamber 13 and into float tube 20, the float 29 will so cooperate with the fluid as to yield a desired reading on the stem 32 adjacent the upper level of the fluid in tube 20, thereby giving a reading to the observer which will be used with a chart of specific gravity values that will be hereinafter described.

The downwardly extending sleeve 16 is part of the hydrometer's intake tube means through which electrolyte may be drawn into the chamber 13. The intake tube means may be a single tubular part that is molded integral with the body 12, or may be made up of connected segments. In FIGURE 2, the intake means includes the resilient sleeve 16 connected to an elongated tubular resilient part 34 by a tubular sleeve 35 whose opposite ends are press fit into the adjacent ends of sleeves 16 and 34.

A thermometer 36 is provided for partaking of and measuring the temperature of the electrolyte within the hollow body 12. As shown, the thermometer 36 is of the glass type which has an enlarged bulb 37 and an elongated stem 38. The bulb 37 is forced through a passageway 39 defined in the lower wall of the hollow body 12 so that the bulb portion of the thermometer is located within the portion of the chamber 13 defined by the laterally enlarged portion 18 of the hollow body 12. The resiliency of the material of the hollow body 12 is such that a good seal is provided between the walls of the bore 39 and the walls of the thermometer stem 38, so as to prevent any leakage of electrolyte at that point.

The thermometer 36 is arranged so that the stem 38 thereof extends vertically downwardly from chamber 13, in spaced relation to the longitudinal axis of the intake tube 34 which extends downwardly of chamber 13. The thermometer stem 38 is also in general vertical alignment with the stem 32 of the float. The latter feature is best seen in the frontal view of the hydrometer shown in FIGURE 1.

There is provided a chart-carrying, cylindrical, sleeve member 40 which has specific gravity values arranged thereon in tabular form. The specific gravity values may either be printed directly on the outer surface of sleeve 40 or may be printed on a chart member which is wrapped around sleeve 40 and is attached thereto. The chart values are arranged to be read both as a function of the specific gravity measured by float 29 and the temperature measured by thermometer 36. The variation of specific gravity with temperature is obtained by aligning a selected vertical row of values with the temperature of fluid being measured. The temperature of the fluid in chamber 13 is reflected in the level of the indicating fluid within the thermometer stem 38 as indicated by numeral 41 in FIGURES 1 and 2.

The sleeve 40 is provided with a serrated peripheral knob portion 44, the purpose of which will become apparent. The chart-carrying sleeve 40 is arranged for rotation about the axis of the downwardly extending intake tube means, and said sleeve 40 is located immediately below the lateral extending portion 18 of body 12 and concentric with the upper portions of the intake tube means. This permits the lowermost portion 34a of the intake tube means to extend below the chart to be free for unobstructed insertion thereof into a battery to be tested. The size of sleeve 40 is so related to the lateral enlargement 18 of body 12 and to the location of thermometer 36 that the thermometer stem 38 is located outside, or beyond, the plane of the chart on sleeve 40. This permits the thermometer stem 38 to be located closely adjacent the sleeve 40 so that the level 41 of the temperature-responsive material in thermometer 36 may be readily visually aligned with the chart material on sleeve 40, and so that the specific gravity values, as corrected by temperature, may be quickly imparted to an observer.

The greater portion of the hollow body 12 and all of the thermometer 36 and the chart 40 are encased within a housing, or shell, generally indicated at 46, which is preferably of molded construction. The housing 46 is of split construction involving two complementary parts, a forward part 46a and a rearward part 46b. The housing parts are provided with aligned apertures through which extend a plurality of nut and bolt connections, generally indicated at 48, for the purpose of tightly drawing together the said complementary portions of the housing 46. The hollow body 12 is provided with a peripheral recess 50 into which extend flanged edges of the housing parts 46a and 46b to define a snug and sealing connection therebetween. Certain lower edges of the housing parts 46a and 46b are arranged to cooperate with an annular recess 52 defined on the downwardly extending intake tube 34.

The front housing part 46a carries therein an enlarging, or magnifying, window 54 to increase readability of the thermometer 36 and the indicia on the chart 40. The casing 46 is also provided with an internal wall 56, carried by one of the housing portions and which has a recessed portion 56a that cooperates with a rubber grommet 58 on the lower end of stem 38 of the thermometer and serves to hold the thermometer 38 in its desired position. The wall 56 is also apertured at 56b through which tube 34 extends.

The rear casing portion 46b is provided with an aperture 60 through which extends a portion of the circular knob, or serrated edge, 44 of sleeve 40, and this permits the operator to selectively rotate the chart 40 to selected indicia settings corresponding with the indicia noted from the stem 32 of the float. It will be understood that the lower edge of the chart 40, as best seen in FIGURE 1, carries a horizontal line of indicia letters 62 which correspond with the indicia letters found on the stem 32 and, in the operation of the device, the operator reads the specific indicia on stem 32 and then rotates the chart 40 through the actuation of the knob means 44 to a point where the specific noted indicia on line 62 is adjacent the stem of the thermometer 36, and then by noting the level 41 of the fluid in the thermometer and reading laterally to the selected vertical column aligned with the said indica, the operator immediately determines the true temperature-corrected specific gravity of the fluid that has been drawn into chamber 13 of the hydrometer by the suction bulb 24.

The sleeve 40 may be mounted in a number of manners for rotation about the axis of the intake tube means. In one such manner the sleeve 40 carries an inwardly extending spider which is rotatably mounted on some portion of the intake tube means. In the specific construction shown in FIGURE 2, the interior of the casing parts 46a and 46b are shaped to define journal and shoulder means which permits sleeve 40 to be rotated while maintaining sleeve 40 properly centered. Thus, the assembled casing defines spaced arcuate shoulder means 70 and 72 against which the lower edge and upper edge of sleeve 40 are adapted to abut to axially locate sleeve 40. The casing 46 also has a plurality of spaced arcuate lands or shoulders 74 and 76 which are adapted to engage the periphery of sleeve 40 to limit lateral movement of sleeve 40.

The intake tube 34 extends downwardly below casing 46, as seen at 34a in FIGURE 1, and said lower end of tube 34 permits of free, unobstructed entry into the well of a battery for drawing fluid, by the action of suction bulb 24, from the battery upwardly into chamber 13, where the fluid serves not only to effect raising of the float, but the temperature of the fluid is partaken of by the thermometer 36, whose bulb 37 is exposed to the vary same fluid that causes the float 29 to rise.

From the foregoing it will be seen that the bulb of the temperature measuring element and the float of the specific gravity measuring element of the hydrometer 10 are located in relatively close proximity to each other, and each engages the same portion of battery fluid that is drawn into the unobstructed chamber 13, so that the measurements being made avoid the errors which may be attendant with unusual temperature gradients that may be found where the measuring elements are not closely adjacent each other. Furthermore, by having the float 29 and thermometer 36 extend from chamber 13 in opposite directions, the hydrometer 10 insures that neither of said measuring elements interferes with the reading of the value being determined by the other measuring element.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. A battery hydrometer comprising, in combination, chamber-defining means defining a substantially unobstructed electrolyte-receiving chamber, an elongated float tube communicating with said chamber and extending upwardly therefrom, an elongated intake tube communicating with said chamber and extending downwardly therefrom, a float having a buoyant portion positioned to be engaged by electrolyte in said chamber and an elongated indicator stem extending longitudinally upwardly in said float tube, suction means on the upper end of said float tube being operative to draw electrolyte through said intake tube and into said chamber to engage said float, a chart member adjacent the upper portion of said intake tube below said chamber-defining means, so as to leave the lowermost portion of the intake tube free for unobstructed insertion thereof into a battery to be tested, the said chamber being laterally enlarged to a point beyond the plane of said chart member, a bulb-type thermometer having its bulb located in said laterally enlarged chamber to partake of the temperature of the electrolyte received therein and having its stem extending downwardly below said chamber-defining means and outwardly of said chart member, so that the level of the temperature-sensitive material in the thermometer may be visually aligned with chart material on said chart member to impart information to an observer as to the temperature-corrected specific gravity of the battery fluid being tested.

2. A battery hydrometer as set forth in claim 1 wherein said chart member is tubular and surrounds the upper portion of said intake tube, means mounting said tubular chart for rotation about the longitudinal axis of said intake tube, and a circular knob carried by said chart member for effecting selective rotation of said chart to bring selected chart material on said chart member into aligned view with said thermometer.

3. A battery hydrometer as set forth in claim 1 including a housing enclosing said laterally enlarged portion of the electrolyte-receiving chamber, said thermometer and said chart member, and a magnifying window in said housing through which said thermometer and chart member may be viewed.

4. A battery hydrometer as set forth in claim 1 including a housing enclosing said laterally enlarged portion of said electrolyte-receiving chamber, said thermometer and said chart member, and means on said housing for engaging and steadying the stem of said thermometer adjacent its lower end.

5. A battery hydrometer as set forth in claim 1 including a housing enclosing said laterally enlarged portion of the electrolyte-receiving chamber, said thermometer and said chart member, a magnifying window in said housing through which said thermometer and chart member may be viewed, a control member associated with said chart member for selectively moving said chart member relative to said thermometer, and said housing having an aperture through which said control member extends to permit of such selective movement of said chart member.

6. A temperature-corrected battery hydrometer of the type having temperature-correlated specific-gravity indicia noted on a chart member carried by the hydrometer, said hydrometer comprising, in combination: a float-chamber of substantially unobstructured interior adapted to receive battery electrolyte therein; transparent float tube means extending upwardly from the float-chamber; a float-carried indicator viewable through said float tube; intake tube means extending downwardly from the float-chamber; bulb-thermometer means, adapted to partake of the temperature of the electrolyte, spaced from said intake tube means and having its bulb located in said float-chamber to partake of the temperature of the electrolyte received therein, and having the stem of the thermometer extending downwardly from said float-chamber; and a movably mounted chart member disposed between said intake tube means and the stem of said thermometer, so that selected chart material on said chart member, corresponding to a measurement noted on said float indicator, may be visually aligned with the temperature reading on the stem of said thermometer to disclose to an observer the temperature-corrected specific gravity of the battery fluid being tested.

References Cited in the file of this patent

UNITED STATES PATENTS 2,331,542     Edelmann     Oct. 12, 1943
2,704,450     Edelmann     Mar. 22, 1955